US010950976B2

(12) United States Patent
Ding et al.

(10) Patent No.: US 10,950,976 B2
(45) Date of Patent: Mar. 16, 2021

(54) CONNECTOR ASSEMBLY

(71) Applicant: HARTING (Zhuhai) Manufacturing Co., Ltd., Guangdong (CN)

(72) Inventors: Chuansheng Ding, Guangdong (CN); Alexander Schönfeld, Osnabrück (DE); Sebastian Griepenstroh, Lübbecke (DE); Dieter Riepe, Lübbecke (DE); Heiko Meier, Minden (DE); Florian Hackemeier, Rahden (DE)

(73) Assignee: HARTING (ZHUHAI) MANUFACTURING CO., LTD.

( * ) Notice: Subject to any disclaimer, the term of this patent is extended or adjusted under 35 U.S.C. 154(b) by 0 days.

(21) Appl. No.: 16/490,867

(22) PCT Filed: Mar. 8, 2017

(86) PCT No.: PCT/CN2017/076010
§ 371 (c)(1),
(2) Date: Sep. 3, 2019

(87) PCT Pub. No.: WO2018/161285
PCT Pub. Date: Sep. 13, 2018

(65) Prior Publication Data
US 2020/0006893 A1 Jan. 2, 2020

(51) Int. Cl.
*H01R 13/629* (2006.01)
*G02B 6/38* (2006.01)
(Continued)

(52) U.S. Cl.
CPC ..... *H01R 13/62938* (2013.01); *G02B 6/3817* (2013.01); *G02B 6/3825* (2013.01);
(Continued)

(58) Field of Classification Search
CPC ........ H01R 13/62938; H01R 13/62955; H01R 13/62977; H01R 13/62933;
(Continued)

(56) References Cited

U.S. PATENT DOCUMENTS

| | | | | |
|---|---|---|---|---|
| 5,564,935 A | * | 10/1996 | Yagi | H01R 13/62966 439/157 |
| 5,924,880 A | | 7/1999 | Watanabe et al. | 439/157 |

(Continued)

FOREIGN PATENT DOCUMENTS

| | | | |
|---|---|---|---|
| CN | 102629720 | 8/2012 | .......... H01R 13/629 |
| CN | 103222118 | 7/2013 | .......... H01R 13/629 |
| EP | 1028494 | 8/2000 | .......... H01R 13/629 |

OTHER PUBLICATIONS

International Search Report and Written Opinion issued in application No. PCT/CN2017/076010, dated Nov. 29, 2017 (8 pgs).

*Primary Examiner* — Abdullah A Riyami
*Assistant Examiner* — Justin M Kratt
(74) *Attorney, Agent, or Firm* — Hayes Soloway P.C.

(57) ABSTRACT

Disclosed is a connector assembly having a first connector part and a second connector part. The first connector part includes a lever mounted on a base body of the first connector part for pivotable movement about a pivot axis (C) between first and second positions relative to the base body. The connector assembly can be brought from a ready-to-mate state into a mated state by relative movement of the first and second connector parts towards each other along a connection axis and vice versa. At least one engaging portion of the lever interacts with at least one counter-engaging portion of the second connector part in such a way, that the connector assembly is forcibly brought from the mated to the ready-to-mate state by pivoting the lever from (Continued)

the first position into the second position when the connector assembly is in the mated state.

19 Claims, 6 Drawing Sheets

(51) Int. Cl.
| | | |
|---|---|---|
| H01R 13/193 | (2006.01) | |
| H01R 13/633 | (2006.01) | |
| H01R 12/88 | (2011.01) | |
| H01R 13/627 | (2006.01) | |
| H01R 13/631 | (2006.01) | |
| H01R 13/436 | (2006.01) | |
| H01R 43/26 | (2006.01) | |
| H01R 13/62 | (2006.01) | |

(52) U.S. Cl.
CPC ......... *G02B 6/3879* (2013.01); *G02B 6/3897* (2013.01); *H01R 12/88* (2013.01); *H01R 13/193* (2013.01); *H01R 13/4362* (2013.01); *H01R 13/4365* (2013.01); *H01R 13/62* (2013.01); *H01R 13/629* (2013.01); *H01R 13/6272* (2013.01); *H01R 13/62905* (2013.01); *H01R 13/62922* (2013.01); *H01R 13/62927* (2013.01); *H01R 13/62933* (2013.01); *H01R 13/62955* (2013.01); *H01R 13/62972* (2013.01); *H01R 13/62977* (2013.01); *H01R 13/631* (2013.01); *H01R 13/633* (2013.01); *H01R 43/26* (2013.01)

(58) Field of Classification Search
CPC .. H01R 13/62922; H01R 12/88; H01R 43/26; H01R 13/6272; H01R 13/4362; H01R 13/62; H01R 13/62905; H01R 13/62927; H01R 13/631; H01R 13/633; H01R 13/193; H01R 13/4365; H01R 13/629; H01R 13/62972; G02B 6/3817; G02B 6/3879; G02B 6/3897; G02B 6/3825
USPC ............................... 439/157, 372, 577, 752
See application file for complete search history.

(56) References Cited

U.S. PATENT DOCUMENTS

| | | | |
|---|---|---|---|
| 8,641,433 B2* | 2/2014 | Uchida | H01R 13/62955 439/157 |
| 9,130,324 B2 | 9/2015 | Furuya et al. | H01R 24/005 |
| 2002/0160638 A1 | 10/2002 | Hamai et al. | 439/157 |
| 2003/0109166 A1* | 6/2003 | Ookura | H01R 13/74 439/372 |
| 2007/0238336 A1* | 10/2007 | Frederiksen | H01R 13/62955 439/157 |
| 2012/0202376 A1 | 8/2012 | Shiga | 439/533 |
| 2014/0378006 A1* | 12/2014 | Pade | H01R 13/4361 439/752 |
| 2015/0147911 A1* | 5/2015 | Logan, Jr. | H01R 12/91 439/577 |
| 2015/0295352 A1* | 10/2015 | Kim | H01R 13/62938 439/157 |

* cited by examiner

CONNECTOR ASSEMBLY

FIELD OF THE INVENTION

The invention concerns a connector assembly, comprising a first connector part and a second connector part, wherein the first connector part comprises a lever which is pivotably mounted on a base body of the first connector part for pivotable movement about a pivot axis between a first and a second position relative to the base body of the first connector part. The connector assembly can be brought from a ready-to-mate state into a mated state by relative movement of the first and the second connector part towards each other along a connection axis and vice versa. The first connector part accommodates a plurality of a first type of first contact elements and the second connector part accommodates a plurality of a first type of second contact elements wherein the first type of first contact elements matches the first type of second contact elements, wherein the plurality of the first type of first contact elements and the plurality of the first type of second contact elements being respectively connected in the mated state of the connector assembly. The lever is in the first position when the connector assembly is in the mated state, wherein at least one engaging portion of the lever is engaged with at least one counter-engaging portion of the second connector part.

BACKGROUND OF THE INVENTION

Connector assemblies for e.g. establishing electrical connections used in various applications often employ a large number of connecting terminals and therefore require a large mating and in particular release, i.e. unmating, force to secure the connection between the connector parts of the assembly. Significant friction and clamping forces of the terminals must be overcome to properly connect and disconnect the connector parts. Furthermore, the connector parts must be secured against an unwanted pulling out in order to ensure proper functioning of the connection under various conditions.

Previous connector assemblies have employed locking devices comprising screw connections, springs, detents and bayonet mechanisms to assist the establishing of the connection. However, in such solutions, problems often occur when the connectors are not properly aligned prior to application of the mating force or when the connector parts become misaligned during establishing the connection. As such, an operator is often required to exactly align and mate the connector parts while applying sufficient force to establish the connection. Moreover, once the connection is established and needs to be released, it is often difficult to pull out the connector parts from each other during disconnecting the assembly with sufficient force without applying too much force to e.g. a mounting of the connector or the connector housing, thus bearing the risk of damaging the connector assembly. In addition, after pull-out, the connector assembly is often in an undefined state which is undesirable for a controlled handling of the connector assembly during mating and unmating.

It is therefore the object of the present invention to overcome the disadvantages of the prior art. In particular, it is the object of the invention to provide a connector assembly that allows for easy and controlled handling, preferably during disconnecting the connector assembly. At the same time, an application of a sufficiently large unmating force shall be permitted without the risk of damage of the assembly. Further, the invention shall provide for a versatile and secure connector assembly that can be employed in various applications.

SUMMARY OF THE INVENTION

The object of the invention is solved by a connector assembly, comprising a first connector part and a second connector part, wherein the first connector part comprises a lever which is pivotably mounted on a base body of the first connector part for pivotable movement about a pivot axis between a first and a second position relative to the base body of the first connector part. The connector assembly can be brought from a ready-to-mate state into a mated state by relative movement of the first and the second connector part towards each other along a connection axis and vice versa. The first connector part accommodates a plurality of a first type of first contact elements and the second connector part accommodates a plurality of a first type of second contact elements wherein the first type of first contact elements matches the first type of second contact elements, wherein the plurality of the first type of first contact elements and the plurality of the first type of second contact elements being respectively connected in the mated state of the connector assembly. The lever is in the first position when the connector assembly is in the mated state, wherein at least one engaging portion of the lever is engaged with at least one counter-engaging portion of the second connector part. The connector assembly is characterized in that the at least one engaging portion of the lever interacts with the at least one counter-engaging portion of the second connector part of the connector assembly in such a way, that the connector assembly is forcibly brought from the mated state into the ready-to-mate state by pivoting the lever from the first position into the second position when the connector assembly is in the mated state.

The connector assembly of the invention thus allows for a controlled release of the connector assembly from a mated state into a ready-to-mate state by pivoting the lever from the first into the second position. Due to the lever, a force necessary for overcoming a mating or plug-in force in the mated state can be easily increased by lever principle. As such, even tightly fitting mated states can be released with little effort by an operator.

The ready-to-mate state is thereby defined as an easy to establish or to release intermediate state when establishing or releasing the mated state of the connector assembly, respectively. The first and second connector part can e.g. be engaged by guiding means in the ready-to-mate state such that the connector parts are held in a defined position. In the ready-to-mate state, the first and second contact elements can be already connected whereas generally they are not connected. The ready-to-mate state is usually established by an operator who arranges the first and the second connector part accordingly prior to establishing the mated state, i.e. when connecting the connector assembly, or is released by the operator after the release of the mated state when disconnecting the connector assembly.

Preferably, the first engaging portion comprises a first cam that engages against a first counter-cam of the at least one counter-engaging portion when pivoting the lever from the first to the second position in order to exert a relative force onto the first and the second connector part, forcing them away from each other opposite to the connection direction. The first cam thereby preferably has a smaller distance from the pivoting axis than a free end of the lever.

The lever is preferably in the second position when the connector assembly is in the ready-to-mate state and the at least one engaging portion engages with the at least one counter-engaging portion in such a way that, when the lever is pivoted from the second position into the first position, the connector assembly is forcibly brought from the ready-to-mate state into the mated state. Advantageously, the first connector part has a latching device for latching the lever in the second position. As such, it is possible to hold the lever in the second position for establishing the ready-to-mate state prior to bringing the connector assembly into the mated state.

In a preferred embodiment, the first engaging portion comprises a second cam that engages against a second counter-cam of the at least one counter-engaging portion when pivoting the lever from the second to the first position in order to exert a relative force onto the first and the second connector part forcing them towards each other along the connection direction. As such, it is not only possible to easily release the mated state of the connector assembly by pivoting the lever, it is also possible to easily establish the mated state from the ready-to-mate state.

Preferably, the at least one engaging portion and the at least one counter-engaging portion are fully disengaged when the connector assembly is in the ready-to-mate state and can be brought into engagement during the pivoting of the lever from the second position towards the first position. As such, the ready-to-mate state can be easily established without having to take care of engaging the at least one engaging portion and the at least one counter-engaging portion during establishing the ready-to-mate state. Once the ready-to-mate state has been established, the engaging portions automatically engage when the lever is pivoted.

The first and the second connector part can have corresponding guiding means for guiding the relative movement of the connector parts between the mated state and the ready-to-mate state and vice versa along the connection direction. The guiding means can be engaged by the operator in order to establish the ready-to-mate state prior to bringing the connector assembly into the mated state. The guiding means can be formed as e.g. guiding rails on one of the connector parts and corresponding engaging guiding pins on the other one of the connector parts or e.g. as sleeves surrounding plug faces of the first and second connector part which telescopically engage with each other. Alternatively, the guiding means can be embodied as guide pins extending into the connection direction on one of the connector parts which can be inserted in corresponding guide sockets on the other connector part.

In a preferred embodiment, the at least one engaging portion and the at least one counter-engaging portion have complementary latching elements which latch the lever in the first position when the connector assembly is in the mated state. Preferably, the latching element of the at least one engaging portion on the lever is formed as a latching depression and the latching element of the at least one counter-engaging portion on the second connector part is formed as a latching protrusion. The latching depression is preferably formed in or adjacent to the second cam of the at least one engaging portion and the latching protrusion is formed on or adjacent to the second counter-cam of the at least one counter engaging portion of the second connector part.

Preferably, the one or both latching elements, in particular the latching depression and/or the latching protrusion, is/are loaded by a spring element. By spring loading one or both of the latching elements, the latching action is more effective and can be better secured.

Preferably, the at least one engaging portion of the lever is formed as a recess in the lever, in particular a recess formed in a lateral side wall of the lever which essentially extends in a plane which is perpendicular to a pivot axis of the lever. The pivot axis of the lever is thereby preferably perpendicular to the connection direction. The first and second cam of the at least one engaging portion are preferably formed on trailing and leading edges of the recess, respectively, relative to the connection direction.

The at least one counter-engaging portion of the second connector part is preferably formed as an elongate protrusion on the second connector, particularly extending in a direction perpendicular to the connection direction and preferably perpendicular to the pivot axis of the lever. The protrusion can be formed on the outside of a housing or base body of the second connector part. The orientation of the pivot axis of the lever thereby refers to the orientation in the mated state or in the ready-to-mate state.

The recess of the at least one engaging portion of the lever and the protrusion of the at least one counter-engaging portion of the second connector part preferably engage with each other in a direction essentially perpendicular to the pivot axis of the lever and perpendicular to the connection direction. The protrusion is thereby preferably accommodated essentially in full within the recess when the lever is in the first position in the mated state of the connector assembly. The at least one engaging portion of the lever and the at least one counter-engaging portion thus can be brought into engagement in a direction perpendicular to the connection direction. This has the advantage that, as soon as the engaging portion and the counter-engaging portion are at least partially engaged, the connector assembly is secured against an involuntary pull out opposite to the connection direction.

In a preferred embodiment, the lever has a further engaging portion corresponding to the at least one engaging portion and the second connector part has a further counter-engaging portion corresponding to the at least one counter-engaging portion, wherein the at least one and the further engaging portion and the at least one and the further counter-engaging portion, respectively, are symmetrically arranged with respect to the connection direction. As such, the force exerted via the engaging portions when the lever is pivoted from the first to the second position and vice versa is provided symmetrically with respect to the connection direction. This is particularly advantageous when the connector parts have a comparatively large lateral dimension, i.e. perpendicular to the connection direction.

In a preferred embodiment, the pivot axis of the lever is perpendicular to the connection direction and the lever has a longitudinal axis which is perpendicular to the pivot axis, wherein the longitudinal axis of the lever is essentially parallel to the connection direction when the lever is in the first position. The longitudinal direction of the lever thereby refers to a general direction along which an operating lever arm of the lever extends away from the pivot axis.

According to a preferred embodiment, the lever is pivoted into the connection direction and towards the second connector part when pivoting from the second into the first position. Pivoting into the connection direction thereby refers to a forward pivoting of the operating lever arm of the lever.

The lever is preferably arranged with its longitudinal axis at an angle with respect to the connection direction when it is in the second position, preferably at an angle larger than 45 degrees. As such, the lever, in particular the operating lever arm, in the second position does not obstruct the plug faces of the connector parts and does not inhibit establishing the ready-to-mate state. Preferably, the lever, in particular the operating lever arm, is formed and dimensioned such that it extends beyond the second connector part in connection direction when it is in the first position in the mated state of the connector assembly. As such, the free end of the lever, in particular of the operating lever arm, is located beyond the second connector part and can easily be gripped by an operator for releasing the mated state. In addition, the lever can protect the second connector part in the mated state. The lever therefore preferably comprises a first cover shell that, preferably fully, covers the second connector part in the mated state of the connector assembly when the lever is in the first position. Preferably, the operating lever arm is formed as the first cover shell.

In a preferred embodiment, the second connector part has cable outlets on a cable outlet side which is facing away from a plug face in the connection direction. The lever extending beyond the second connector part can thus also protect cables exiting the second connector part at the cable outlets. The lever can comprise a second cover portion for protecting the cables exiting at the cable outlets of the second connector part, the second cover portion thus forming a wire protection cover.

Preferably, the cables exiting at the cable outlets are bent by about 90 degree with respect to the connection direction. For better protection, the second cover portion in this case is also angled with respect to the longitudinal lever axis to cover the cable outlet side of the second connector part. Preferably, the second cover portion is essentially perpendicular with respect to the longitudinal axis of the lever such that the second cover portion is essentially perpendicular to the connection direction when the lever is in the first position. The first and the second cover portions of the lever in this case, essentially fully, cover the second connector part and the cables exiting at the cable outlets when the connector assembly is in the mated state and the lever is in the first position.

In a preferred embodiment, the second connector part is adapted for stationary mounting whereas the first connector part is adapted for cable mounting.

In a further preferred embodiment, the first connector part accommodates a second type of first contact elements and the second connector part accommodates a second type of second contact elements wherein the second type of first contact elements matches the second type of second contact elements, and the second type of first contact elements and the second type of second contact elements are respectively connected in the mated state of the connector assembly. As such, the connector assembly can be adapted for various applications, in particular for simultaneously establishing connections for different types. Particularly preferable, the first type of first and second contact elements are electrical contact elements and the second type of first and second contact elements are optical contact elements. The connector assembly can also comprise matching contact elements for a third or further types according to the particular requirements. A third type of matching contact elements can e.g. serve as communication line for exchanging information regarding devices which are connected by the connector assembly.

It can be advantageous that the first and/or the second type of first and/or second contact elements are accommodated in a first and/or second contact element holder, respectively, wherein the first and/or second contact element holder form an insert of the respective connector part. Alternatively, it is also possible that one type of contact elements is accommodated directly in the base body of the respective connector part whereas e.g. only the second type is accommodated in a contact element holder.

Preferably, the first and/or the second type of first and/or second contact elements are standardized plug-in connectors and are accommodated in receptacles of the first and/or second connector part, respectively. The receptacles thereby form sockets for the standardized plug-in connectors. As such, e.g. pre-configured cables with already attached plug-in connectors can be easily accommodated in the connector assembly. The receptacles can be formed directly in the base body or in an insert of the respective connector part.

BRIEF DESCRIPTION OF THE DRAWINGS

The invention is further illustrated by exemplary figures. The figures schematically show:

FIG. 5b: a partial side view of FIG. 5a;

Corresponding elements in the figures are generally referred to by the same reference numerals unless mentioned otherwise.

DETAILED DESCRIPTION OF THE INVENTION

Figure 1:
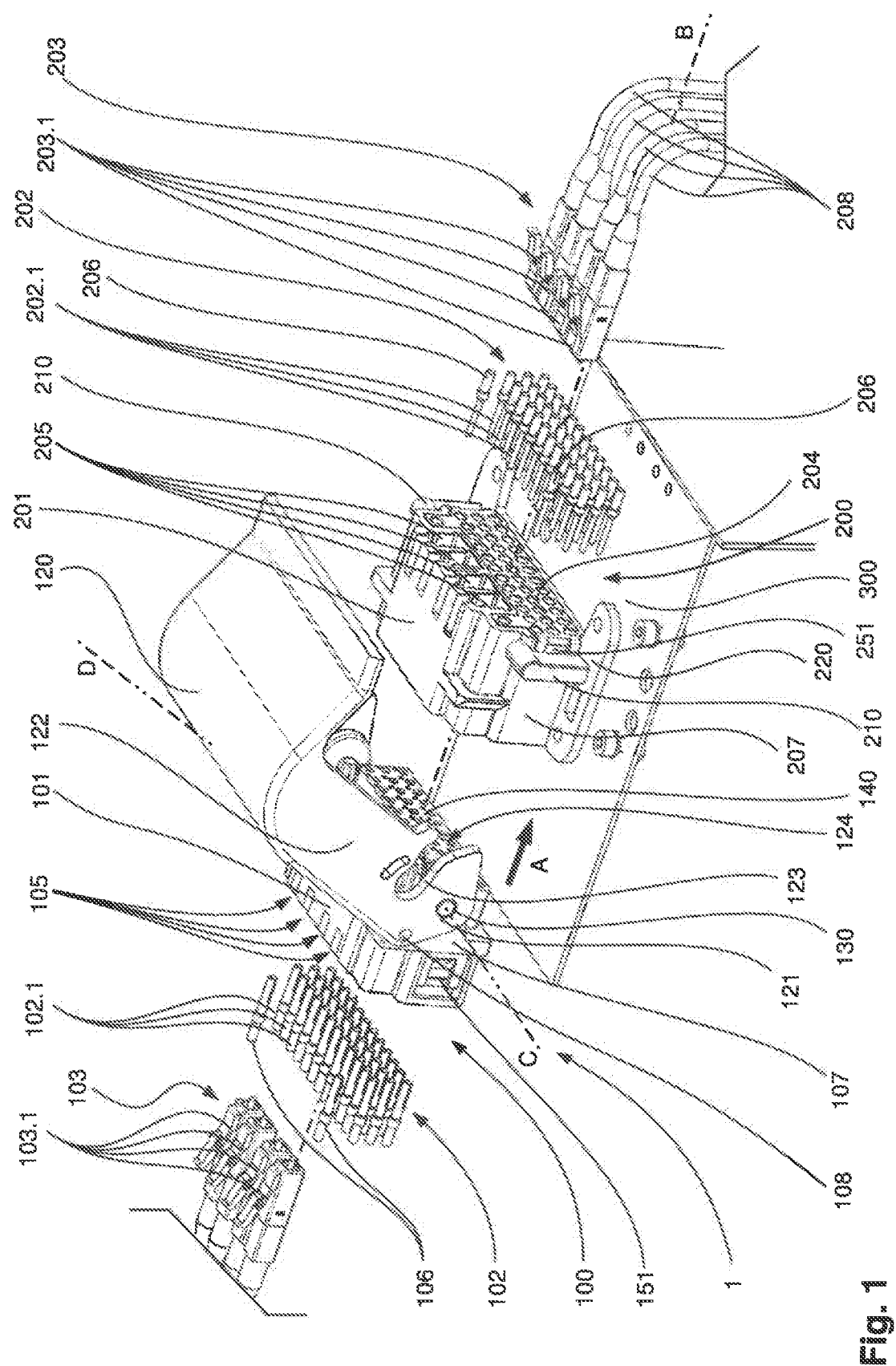
FIG. 1: a partially exploded view of a connector assembly according to the invention.

FIG. 1 shows a partially exploded view of a connector assembly 1 according to the invention. The connector assembly 1 comprises a first connector part 100 and a second connector part 200 which can be connected in a connection direction A. A center axis of the connector assembly 1 along the connection direction A is referred to as connection axis B. All relative orientations of parts of the first connector part 100 and the second connector part 200 are described in an arrangement of the connector parts aligned along the connection axis B and in an orientation for establishing the connection.

The first connector part 100 comprises a base body 101 in which a first type of first contact elements 102 and a second type of first contact elements 103 are accommodated. The first type of contact elements 102 comprises a plurality of electrical contact terminals 102.1 which are held in a terminal holder insert 104. The electrical contact terminals 102.1 are formed as socket contacts for insertion of corresponding pin contacts. The terminal holder insert 104 is held in a corresponding receptacle 150 of the base body 101 of the first connector part 100 (see also FIGS. 3a and 3b). The second type of contact elements 103 comprise a plurality of optical contact terminals 103.1 which are each held in a corresponding receptacle 105 in the base body 101 of the first connector part 100. In the embodiment of FIG. 1, the first connector part 100 accommodates a third type of first contact elements 106 comprising two electrical contact terminals which are also held in the terminal holder insert 104. The third type of first contact elements 106 can correspond to the first type of first contact elements 102, but can serve a different purpose e.g. in their electrical function.

The first connector part 100 comprises a lever 120 which is pivotably attached to the base body 101. The lever 120 is supported on two pivot pins 130 which are coaxially arranged on outer lateral side faces 107 of the base body 101. The pivot pins 130 define a pivot axis C and protrude in opposite directions outwardly along C from the lateral side faces 107. The pivot axis C is perpendicular to the connection direction A and the connection axis B. The lever 120 has two parallel lateral walls 122, each having a pivot hole 121 engaged with one of the pivot pins 130, respectively. The lateral walls 122 each define a plane which is parallel to the connection axis B. The lateral walls 122 are parallel to the lateral side faces 107 of the base body 101. FIG. 1 shows the lever 120 in a second pivot position in which it is pivoted with its longitudinal axis D away from the connection axis B. In particular, the lever 120 encloses an angle larger than zero, preferably larger than 45 degrees and smaller than 90 degrees, with the connection axis B in direction of the connection direction A. The first connector part 100 has a latching device 108 for latching the lever 120 in the second position.

The lateral walls 122 each further comprise an elongate recess 123 which is formed at a distance in direction of D from the pivot axis C, i.e. from the pivot holes 121. The recesses 123 each fully penetrate through the corresponding lateral wall 122 in direction of C and extend in a direction essentially perpendicular to D. The recesses 123 each have an entry opening 124 essentially facing the second connector part 200 when the lever 120 is in the second position. The lever 120 is further described in FIGS. 2a and 2b. The second connector part 200 comprises a base body 201 having a mounting plate 220 for mounting the second connector part 200 on a mounting surface 300. The mounting plate 220 defines a mounting plane in which the second connector part 200 is mounted to the mounting surface 300. The mounting plane is orientated in parallel to the connection axis B. The mounting plate 220 includes mounting holes for bolting the second connector part 200 to the mounting surface 300.

A first type of second contact elements 202 and a second type of second contact elements 203 are accommodated in the base body 201. The first type of second contact elements 202 comprises a plurality of electrical contact terminals 202.1 which are held in a terminal holder insert 204. The electrical contact terminals 202.1 are formed as pin terminals. The terminal holder insert 204 in turn is held in a receptacle 250 of the base body 201 of the second connector part 200 (see also FIGS. 4a and 4b).

The second type of second contact elements 203 comprises a plurality of optical contact terminals 203.1 which are each held in a corresponding receptacle 205 in the base body 201 of the second connector part 200. Cables 208 connected to the optical contact terminals 203.1 are bent by 90 degrees towards the mounting plane after exiting the second connector part 200. Corresponding cables of the electrical contact terminals (not shown) are similarly bent towards the mounting plane.

On outer lateral side faces 207 of the base body 201, the second connector part 200 comprises on each side an elongate protrusion 210 extending perpendicularly to the connection axis B and perpendicularly to the mounting plane. The elongate protrusions 210 extend with their longitudinal axis in a common plane which is perpendicular to the connection axis B (see also FIGS. 4a and 4b). The elongate protrusions 210 each extend from the mounting plate 220 away from the mounting plane with its longitudinal axis in one of the planes defined by the lateral walls 122 of the lever 120, respectively.

Figure 2A:
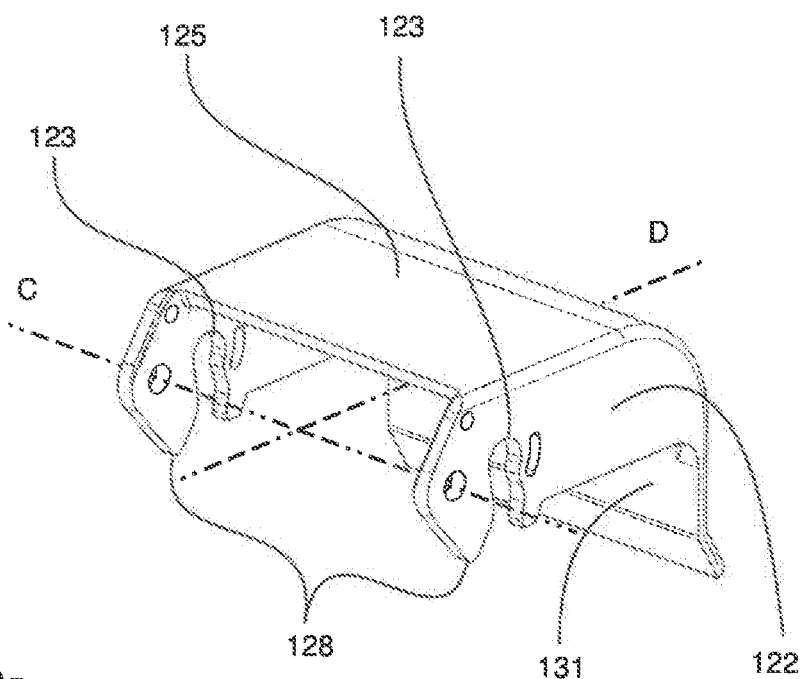
FIG. 2a: a lever of a first connector part of the connector assembly in a first perspective view.
Figure 2B:
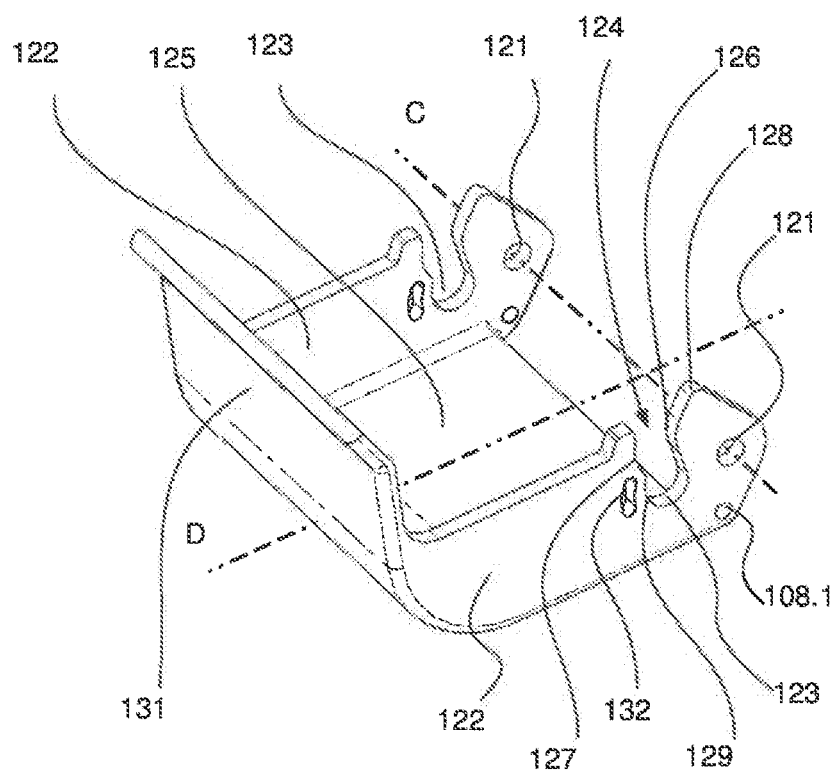
FIG. 2b: the lever in a second perspective view.

FIGS. 2a and 2b show the lever 120 as a separate part detached from the first connector part 100. The lever 120 comprises a base plate 125 extending in longitudinal direction D and parallel to the pivot axis C. The side walls 122 extend from lateral edges of the base plate 125 in a direction perpendicular to C. The base plate 125 and side walls 122 thus have a U-shaped cross section in a plane perpendicular to D. At a free end, on the far side from the pivot axis C, the lever 120 has a closure plate 131 which is essentially perpendicular to D and is connected to the side walls 122 and the base plate 125.

The recesses 123 in the side walls 122 are provided for engagement with the elongate protrusions 210 of the second connector part 200 as is described below. The recesses 123 form engaging portions and the protrusions 210 form counter-engaging portions of the connector assembly 1. The lever 120 is symmetrical with respect to a symmetry plane perpendicular to the pivot axis C and comprising the longitudinal axis D. As can be seen, the pivot holes 121 are arranged in longitudinal end regions on the side walls 122 of the lever 120. The recesses 123 are formed at a distance from C. The entry opening 124 of the recesses 123 are open in a direction facing away from the base plate 125.

Inner side faces of each recess 123 form a first cam 126 and a second cam 127, wherein the first cam 126 is formed by the side face closer to the pivot hole 121 and the second cam 127 by the side face further away. The first cam 126 has a curved shape following a cam-curve around the pivot holes 121 and having an extremal tip 128 with a largest distance from the pivot hole 120. The second cam 127 has a depression 129 forming a latching element for engagement with a corresponding latching element of the elongate protrusions 210. Next to the depression 129, a curved long-hole 132 is formed in the side wall 122, allowing elastic deformation of a section of the side face forming the depression 129.

The side walls 122 each have through holes 108.1 in the vicinity of the pivot hole 121 which is offset with respect to the pivot axis C. The through holes 108.1 form part of the latching device 108 for latching the lever 120 in the second position by engagement with a corresponding latching pin 108.2 on the lateral side faces 107 of the base body 101.

Figure 3A:
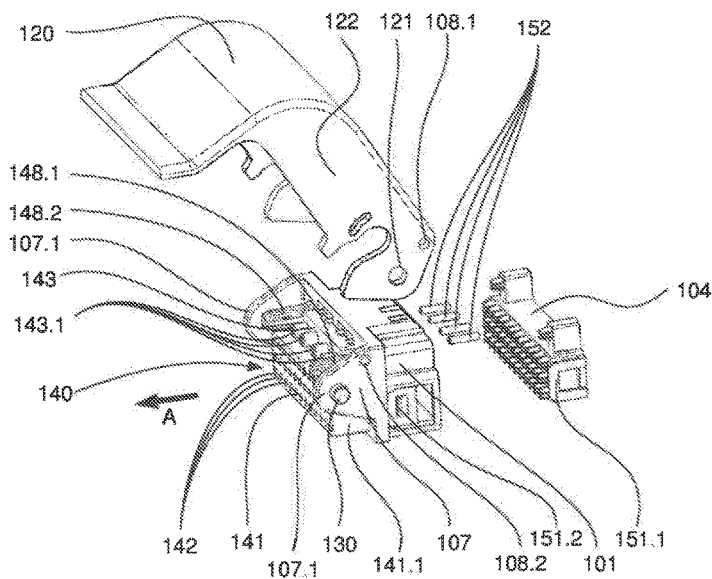
FIG. 3a: the first connector part in an exploded view without first contact elements in a perspective front view.
Figure 3B:
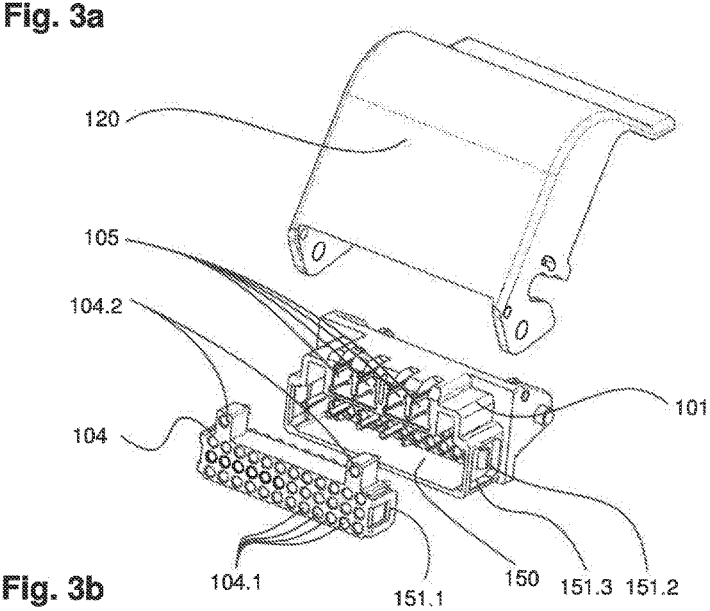
FIG. 3b: the first connector part in an exploded view without first contact elements in a perspective rear view.

FIGS. 3a and 3b show the first connector part 100 in an exploded view without first contact elements 102, 103 and 106 in a front view (FIG. 3a) and a rear view (FIG. 3b). The base body 101 has a plug-face 140 facing in connection direction A. The plug-face 140 has a first plug area 141 forming a plug-in base 141.1 comprising a first plurality of connection holes 142 for connecting the first type of second contact elements 202 to the first type of first contact elements 102 accommodated therein. A second plug area 143 comprises a plurality of plug-in cylinders 143.1 arranged above the first plug area 141, each having a hole for connecting the second type of second contact elements 203 to the second type of first contact elements 103 accommodate therein. The plug-face 140 further comprises two plug-in pillars 148.1 and 148.2 arranged laterally of the second plug area 143. The plug-in pillars 148.1 and 148.2 each have an essentially square cross-section with respect to the connection axis B and have a hole on an end face at their free ends for connecting the third type of second contact elements 206 to the third type of first contact elements 106 accommodated therein. The plug-in pillars 148.1 and 148.2 extend farther in the connection direction A than the plug-in base 141.1 which in turn extends farther in connection direction A than the plug-in cylinders 143.1.

The base body 101 further comprises the receptacle 150 for the insert 104 (see FIG. 3b). The insert 104 serves as a holder for the first type of first contact elements 102 and the third type of first contact elements 106 and comprises a plurality of receptacles 104.1 for receiving the first type of first contact elements 102 and one receptacle 104.2 for each first contact element 106 of the third type. The insert 104 can be clipped by a snap-connection 151 into the receptacle 150 of the base body 101. The snap-connection 151 comprises a latching tongue 151.1 on the insert 104 and a matching latching protrusion 151.2 on the base body 101. The side faces 107 thereby from a receiving space 151.3 for accommodating the latching tongue 151.

The receptacles 105 for the second type of first contact elements 103 are designed to receive standardized optical cable connectors. The corresponding cylindrical plug-in cylinders 143.1 of the second plug area 143 each comprise a split sleeve 152 arranged therein for receiving the optical contact terminals 103.1 of the second type of first contact elements 103. The split sleeves 152 allow for better centering and alignment of the optical contact terminals 103.1 in the first connector part 100. The split sleeves 152 are preferably made from Zirconia.

The lateral side faces 107 of the first connector part 100 are formed on the outside of side walls 107.1 of the base body 101. The pivot pins 130 and the latching pin 108.2 of the latching device 108 are provided on the lateral side faces 107. The lever 120 can be mounted to the base body 101 by bending the side walls 122 away from each other such that the pivot holes 121 can be snapped onto the pivot pins 130.

Figure 4A:
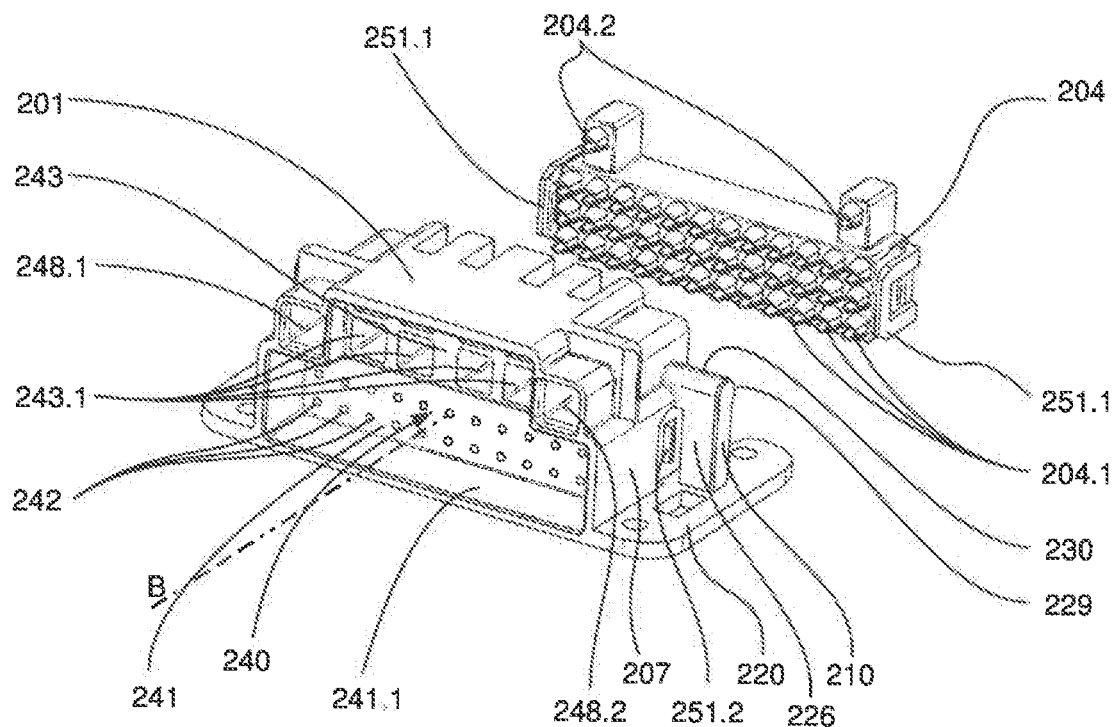
FIG. 4a: a second connector part of the connector assembly in an exploded view without second contact elements in a front view.
Figure 4B:
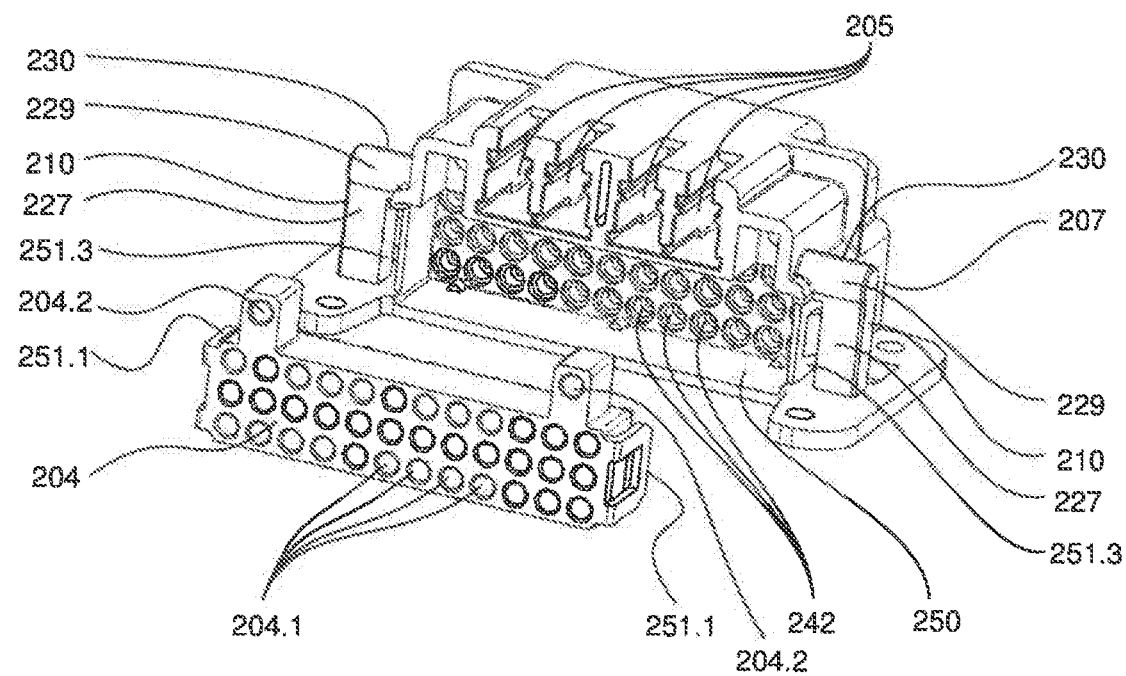
FIG. 4b: the second connector part in an exploded view without second contact elements in a rear view.

FIGS. 4a and 4b show the second connector part 200 in an exploded view without second contact elements 202, 203 and 206 in a front view (FIG. 4a) and a rear view (FIG. 4b). The base body 201 has a plug-face 240. The plug-face 240 has a first plug area 241 forming a plug-in socket 241.1 comprising a first plurality of holes 242 through which pin contacts of the first type of second contact elements 202.1 can project. The plug-in socket 241.1 receives the plug-in base 141.1 in the mated state of the connector assembly 1. A second plug area 243 comprises a plurality of plug-in receptacles 243.1 arranged above the first plug area 241 for receiving the plug-in cylinders 143.1 in a mated state of the connector assembly 1. The plug-face 240 further comprises two separate plug-in receptacles 248.1 and 248.2 arranged laterally of the second plug area 243. The plug-in receptacles 248.1 and 248.2 have an essentially square cross-section and receive the plug-in pillars 148.1 and 148.2, respectively, in the mated state of the connector assembly 1. The matching plug-in pillars 148.1/148.2 and plug-in receptacles 248.1/248.2, respectively, form a further guiding means for guiding the first connector part 100 on the second connector part 200 during transition from the ready-to-mate state to the mated state and vice versa.

The base body 201 further comprises the receptacle 250 for the insert 204 (see FIG. 4b). The insert 204 serves as a holder for the first type of second contact elements 202 and the third type of second contact elements 206 and comprises a plurality of receptacles 204.1 for receiving the first type of second contact elements 102 and one receptacle 204.2 for each second contact element 206 of the third type. The insert 204 can be clipped by a snap-connection 251 into the receptacle 250 of the base body 201. The snap-connection 251 comprises a latching tongue 251.1 on the insert 204 and a matching latching protrusion 251.2 on the base body 201. The latching protrusion 251.2 is arranged essentially between the side face 207 and the elongate protrusion 210, wherein a receptacle 251.3 for accommodating the latching tongue 251.1 between them is formed.

The lateral side faces 207 of the second connector part 200 are formed on the outside of the base body 201. As described in the above, the elongate protrusions 210 each extend from the mounting plate 220 in a direction perpendicular to the mounting plane, i.e. perpendicular to the connection axis B and the pivot axis C. The elongate protrusion 210 is thereby connected to the mounting plate 220 and the lateral side face 207. A face of the elongate protrusion 210 facing the first connector part 100 (when arranged for mating) forms a first counter-cam 226 whereas the oppositely facing face forms a second counter-cam 227. Both the first counter-cam 226 and the second counter-cam 227 are essentially planar. The second counter-cam 227, at its far end 230 as seen from the mounting plate 220, however, has a rounded nose 229 forming a latching element for engagement with the depression 129 of the recess 123 of the lever 120. The nose 229 thereby protrudes in direction of B, away from the first connector part 100, in the connection direction A as indicated in FIG. 1.

Figure 5A:
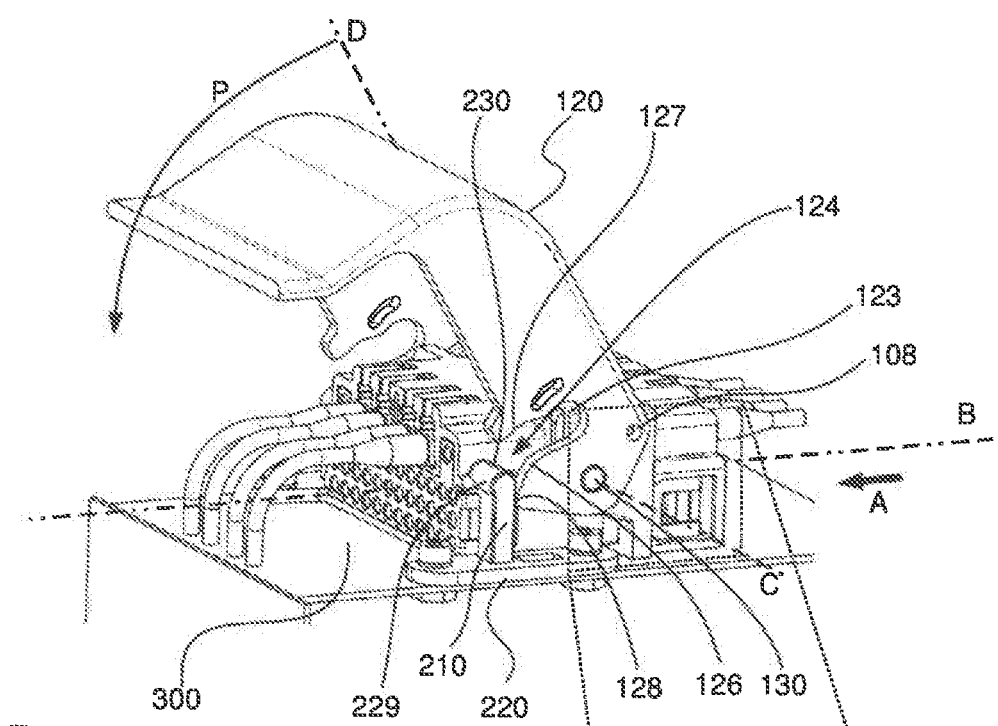
FIG. 5a: a first perspective view of the connector assembly according to the invention in a ready-to-mate state in which the first connector part and the second connector part are partially inserted into each other and the lever is in its second position.
Figure 5B:
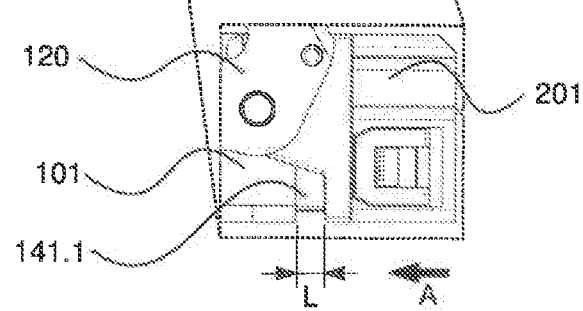
Figure 5C:
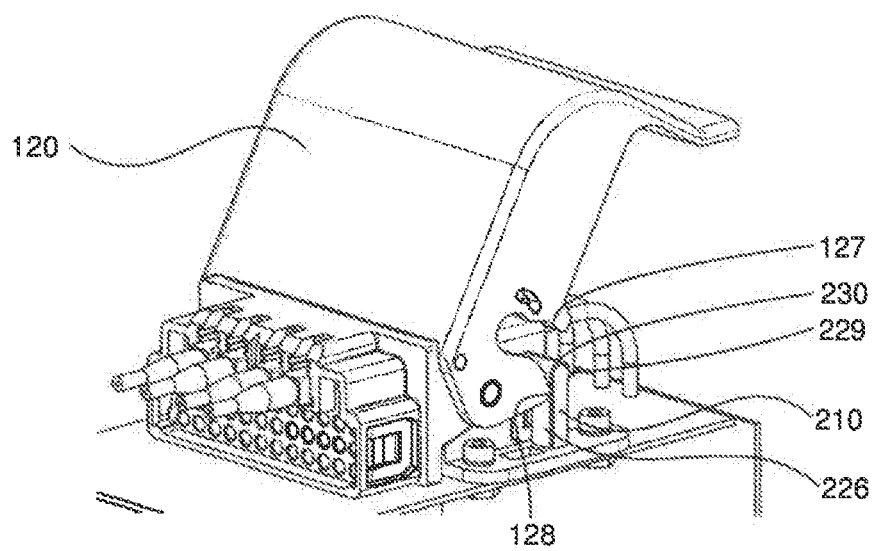
FIG. 5c: a second perspective view of the connector assembly according to the invention in a ready-to-mate state.

FIGS. 5a to 5c show the connector assembly 1 in a ready-to-mate state in which the first connector part 100 and the second connector part 200 are partially inserted into each other and the lever 120 is in its second position. The ready-to-mate state in the present context refers to a state from which the connector assembly 1 can be transferred into a mated state, in particular by pivoting the lever 120 from the second position into its first position, which will be described below. The ready-to-mate state also refers to a state that is obtained during disconnecting the first connector part 100 and the second connector part 200, i.e. when the connector assembly 1 is brought from the mated state to the ready-to-mate state by bringing the lever 120 from the first position to its second position.

In the ready-to-mate state, the first connector part 100 and the second connector part 200 are aligned and partially inserted into each other in the connection direction A along the connection axis B. Thereby, the plug faces 140 and 240 are brought into partial engagement. In particular, the plug-in base 141.1 of the first connector part 100 is partially inserted into the plug-in socket 241.1 as well as the plug-in cylinders 143.1 are inserted into the plug-in receptacles 243.1 and plug-in pillars 148.1 and 148.2 into plug-in receptacles 248.1 and 248.2, respectively. The matching base/cylinders and sockets/receptacles thereby form guiding means for guiding the first connector part 100 on the second connector part 200 during transition from the ready-to-mate state to the mated state and vice versa. The guiding means thereby ensure that the first connector part 100 and second connector part 200 are guided along the connection axis B. At the same time, the engagement of the matching base/cylinders and sockets/receptacles hold the connector assembly 1 in the ready-to-mate state without the need of an operator to keep the connector parts 100 and 200 aligned or in place. In the ready-to mate state, the first type, second type and third type of first contact elements are not necessarily in functional contact with the respective second contact elements. The first connector part 100 and the second connector part 200 are at a distance L from each other as can be seen in the partial view of FIG. 5b.

In the ready-to-mate state, the tip 128 of the first cam 126 of recess 123 is in contact with the first counter-cam 226 of the elongated protrusion 210 of the second connector part 200 while the lever 120 remains latched in its second position by the latching device 108. As can be seen, the entry opening 124 of recess 123, in particular the second cam 127 in the area of the entry opening 124, is formed in such a way that the recess 123 can catch the far end 230 of the elongate protrusion 210 when the lever 120 is pivoted about pivot axis C out of the second position towards the first position, i.e. onto the second connector part 200 (arrow. During the pivoting of the lever 120, the far end 230 of the protrusion 210 enters the recess 123 through the opening 124 and the nose 229 glides onto the second cam 127. Thereby, a relative force in direction of B is exerted between the first and the second connector part via the second cam 127 and the nose 229 of the second counter-cam 227 which forces the first connector part 100 in connection direction A towards the second connector part 200. The recess 123 thus forms an engaging portion of the lever 120 and the elongate protrusion 210 forms a counter-engaging portion of the second connector part 200, respectively, which engage in a direction perpendicular to the connection direction A or the connection axis B.

At the same time, during the pivoting in direction of P, the first cam 126 including the tip 128 is lifted from the first counter-cam 226 or, dependent on the specific shape of the cam 126, idles along the first counter-cam 226 without exerting a relative force between the first connector part 100 and the second connector part 200 along the connection axis B.

Figure 6A:
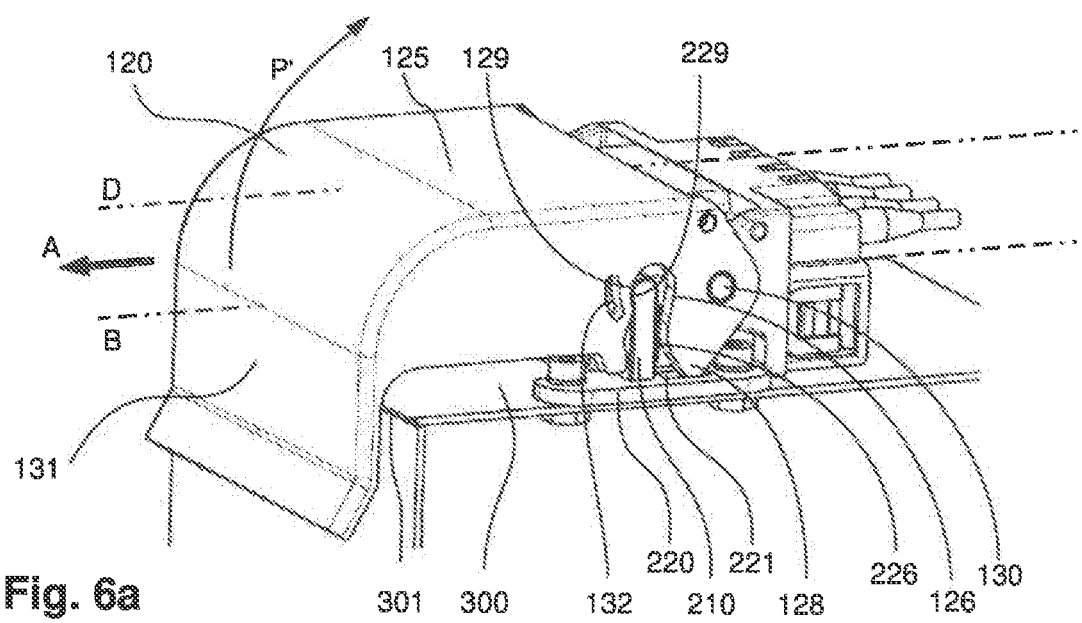
FIG. 6a: a first perspective view of the connector assembly in the mated state in which the first connector part and the second connector part are fully inserted into each other and are connected, and the lever is in its first position.
Figure 6B:
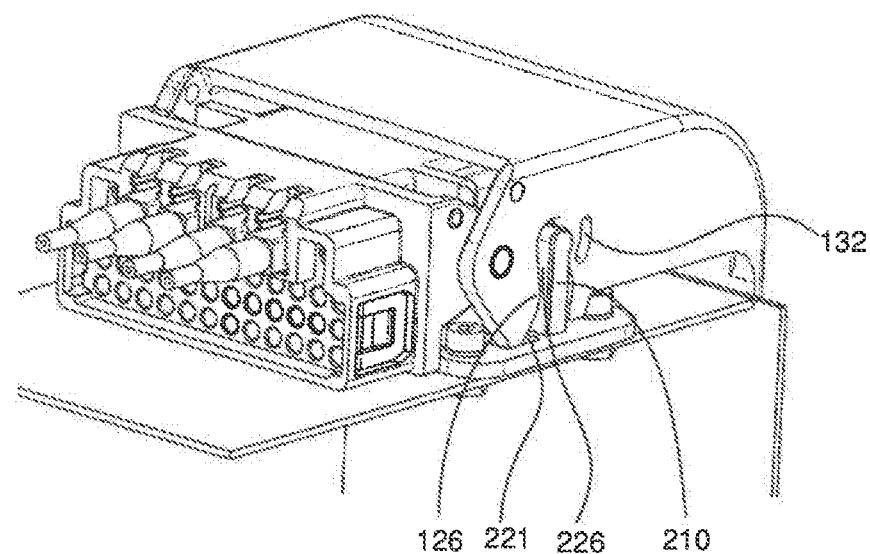
FIG. 6b: a second perspective view of the connector assembly in the mated state.
Figure 6C:
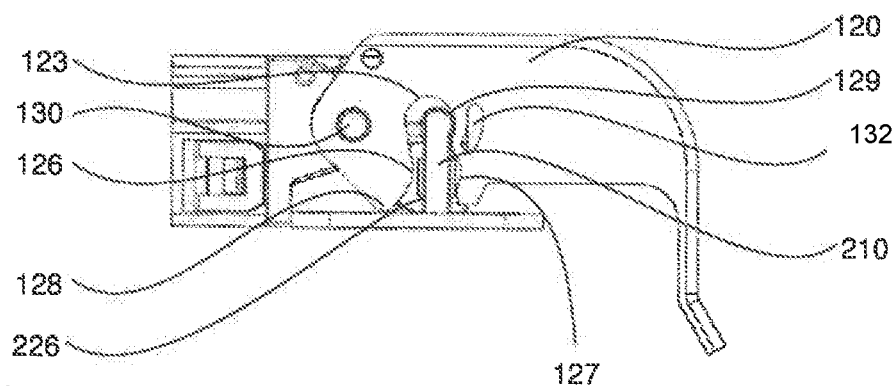
FIG. 6c: a side view of the connector assembly in the mated state.

FIGS. 6a to 6c show the connector assembly 1 in the mated state in which the first connector part 100 and the second connector part 200 are fully inserted into each other and are connected, and the lever 120 is in its first position. By the pivoting action of the lever 120 in direction of P from the second position, the relative force in direction of B exerted between the first and the second connector part via the second cam 127 and the nose 229 of the second counter-cam 227 has forced the first connector part 100 in connection direction A fully into the second connector part 200. The distance L in the ready-to-mate state has thereby been reduced to essentially zero.

The elongate protrusion 210 is fully received in the recess 123, i.e. the first engaging portion is fully engaged with the first counter-engaging portion of the second connector part 200 when the lever 120 is in its first position. The nose 229 has glided along the first counter cam 227 into the depression 129 and was latched therein during the pivoting action. The long-hole 132 thereby enables the depression 129 to elastically deform such that there is a latching force exerted between the depression 129 and the nose 229. The lever 120 is therefore latched in its first position. In the first position, the longitudinal direction of the lever 120 is parallel to the connection axis B.

As can be seen from FIGS. 6a to 6c, the lever 120 extends in connection direction A beyond the second connector part 200 and the base plate 125 is fully lowered onto the second connector part 200. The lateral walls 122 of the lever 120 thereby fully cover the lateral side faces 107 of the second connector 200. The closure plate 131 covers a far end of the second connector part 200 in the connection direction A, i.e. a far end of the connector part 200 which is facing away from the first connector part 100 in the mated state. Thereby, the cables 208 which are bent towards the mounting plane are also fully covered by the lever 120. The lever 120 thus forms a cover shell that essentially fully encloses the second connector part 200, including cables 208 and cable outlets or further cables exiting form the second connector part 200 and, thus, forms a protective shell.

The closure plate 131 extends to below the mounting plane, i.e. to an opposite side of the mounting plane than the side on which the connector parts 100 and 200 are arranged. As such, the lever 120 can also cover an edge 301 of the mounting surface 300, thus further increasing the protection of the second connector part 200. At the same time, the closure plate 131 forms a handle of the lever 120 that can be gripped by an operator in order to pivot the lever 120 e.g. to and from the first position.

In order to enable a more compact construction of the connector assembly 1, the mounting plate 220 of the second connector part 200 has receptacles 221 next to the elongate protrusions 210 arranged opposite to the connection direction A. The receptacles 221 receive the tips 128 of the first cams 126 when the lever 120 is in the first position. By accommodating the tips 128 in the mounting plate 220, the leverage of the lever 120 can be increased, i.e. the distance between tips 128 and pivot axis C can be increased while the construction volume of the connector assembly 1 is not increased.

The connector assembly 1 can be easily brought from the mated state to the ready-to-mate state by pivoting the lever 120 from its first position into its second position. During the corresponding pivoting action in a direction of arrow P', i.e. opposite to P, the nose 229 glides out of the depression 129 against the latching force exerted by the elastic long-hole 132, i.e. the latching is released. At the same time, the first cam 126 is lowered onto the first counter-cam 226 of the elongate protrusion 210. When the pivoting in direction of P' further continues, the first cam 126 exerts a release force onto the first counter-cam 226 by the lever action in direction of the connection axis B, opposite to the connection direction A. The release force is a relative force between the first connector part 100 and the second connector part 200, thus resulting in a displacement of the first connector part 100 with respect to the second connector part 200 in the direction opposite to A. The pivoting action is continued until the lever 120 reaches its second position in which the tip 128 of the first cam 126 lies against the first counter-cam 126 and the ready-to-mate state is reached. As such, the plug-in force in the mated state can be easily overcome by the lever action exerted by lever 120 and first cam 126 onto the elongate protrusion 210. The lever 120 is latched by the latching device 108 in its second position and the recess 123 is fully disengaged from the elongate protrusion 210. The first connector part 100 can therefore be easily pulled out from the second connector part 200 by an operator when the connector assembly 1 is in the ready-to-mate state.

The invention claimed is:

1. A connector assembly,
comprising a first connector part and a second connector part,
the first connector part comprising a lever which is pivotably mounted on a base body of the first connector part for pivotable movement about a pivot axis between a first and a second position relative to the base body of the first connector part,
the connector assembly can be brought from a ready-to-mate state into a mated state by relative movement of the first and the second connector part towards each other along a connection axis and vice versa,
the first connector part accommodates a plurality of a first type of first contact elements and the second connector part accommodates a plurality of a first type of second contact elements wherein the first type of first contact elements matches the first type of second contact elements,
the plurality of the first type of first contact elements of the first connector part and the plurality of the first type of second contact elements of the second connector part being respectively connected in the mated state of the connector assembly,
wherein the lever is in the first position when the connector assembly is in the mated state, wherein at least one engaging portion of the lever is engaged with at least one counter-engaging portion of the second connector part,
wherein the at least one engaging portion of the lever interacts with the at least one counter-engaging portion of the second connector part of the connector assembly in such a way, that the connector assembly is forcibly brought from the mated state into the ready-to-mate state by pivoting the lever from the first position into the second position when the connector assembly is in the mated state,
wherein a first engaging portion of the lever comprises a first cam configured to engage against a first counter-cam of the at least one counter-engaging portion when pivoting the lever from the first to the second position in order to exert a relative force onto the first and the second connector part, forcing them away from each other along a connection direction,
wherein the lever is in the second position when the connector assembly is in the ready-to-mate state and the at least one engaging portion of the lever is configured to engage with the at least one counter-engaging portion in such a way that, when the lever is pivoted from the second position into the first position, the connector assembly is forcibly brought from the ready-to-mate state into the mated state, and
wherein the first engaging portion of the lever comprises a second cam configured to engage against a second counter-cam of the at least one counter-engaging portion when pivoting the lever from the second to the first position in order to exert a relative force onto the first and the second connector part forcing them towards each other along the connection direction.

2. The connector assembly according to claim 1, wherein the at least one engaging portion of the lever and the at least one counter-engaging portion are disengaged when the connector assembly is in the ready-to-mate state and can be brought into engagement during the pivoting of the lever from the second position towards the first position.

3. The connector assembly according to claim 1, wherein the first and the second connector part have corresponding guides for guiding the relative movement between the mated state and the ready-to-mate state and vice versa along the connection direction.

4. The connector assembly according to claim 1, wherein the at least one engaging portion of the lever and the at least one counter-engaging portion have complementary latching elements which latch the lever in the first position when the connector assembly is in the mated state.

5. The connector assembly according to claim 4, wherein the latching element of the at least one engaging portion on the lever is formed as a latching depression and the latching element of the at least one counter-engaging portion on the second connector part is formed as a latching protrusion.

6. The connector assembly according to claim 1, wherein the at least one engaging portion of the lever is formed as a recess in the lever, in particular a recess formed in a lateral side wall of the lever which essentially extends in a plane which is perpendicular to the pivot axis of the lever.

7. The connector assembly according to claim 1, wherein the at least one counter-engaging portion of the second connector part is formed as an elongate protrusion on the second connector part, particularly extending in a direction perpendicular to the connection direction and preferably perpendicular to the pivot axis of the lever.

8. The connector assembly according to claim 1, wherein the lever has a further engaging portion corresponding to the at least one engaging portion of the lever and the second connector part has a further counter-engaging portion corresponding to the at least one counter-engaging portion, wherein the at least one and the further engaging portion and the at least one and the further counter-engaging portions, respectively, are symmetrically arranged with respect to the connection direction.

9. The connector assembly according to claim 1, wherein the first connector part has a latching device for latching the lever in the second position.

10. The connector assembly according to claim 1, wherein the pivot axis of the lever is perpendicular to the connection direction and the lever has a longitudinal axis which is perpendicular to the pivot axis, wherein the longitudinal axis of the lever is essentially parallel to the connection direction when the lever is in the first position.

11. The connector assembly according to claim 1, wherein the lever is pivoted into the connection direction towards the second connector part when pivoting from the second into the first position and the lever preferably extends beyond the second connector part in the connection direction when it is in the first position in the mated state of the connector assembly.

12. The connector assembly according to claim 1, wherein the second connector part has cable outlets on a cable outlet side facing away from a plug face in the connection direction, wherein cables exiting at the cable outlets are preferably bent by 90 degrees with respect to the connection direction.

13. The connector assembly according to claim 1, wherein the lever comprises a first cover shell that, preferably fully, covers the second connector part in the mated state of the connector assembly when the lever is in the first position, wherein the lever preferably has a second cover portion which is angled with respect to a longitudinal lever axis to cover a cable outlet side of the second connector part, wherein the second cover portion is preferably essentially perpendicular with respect to a longitudinal axis of the lever such that the second cover portion is essentially perpendicular to the connection direction when the lever is in the first position.

14. The connector assembly according to claim 1, wherein the second connector part is adapted for stationary mounting whereas the first connector part is adapted for cable mounting.

15. The connector assembly according to claim 1, wherein the first connector part accommodates a second type of first contact elements and the second connector part accommodates a second type of second contact elements wherein the second type of first contact elements matches the second type of second contact elements, and the second type of first contact elements and the second type of second contact elements are respectively connected in the mated state of the connector assembly.

16. The connector assembly according to claim 15, wherein the first type of first and second contact elements are electrical contact elements and the second type of first and second contact elements are optical contact elements.

17. The connector assembly according to claim 15, wherein the first and/or the second type of first and/or second contact elements are accommodated in a first and/or second contact element holder, respectively, wherein the first and/or second contact element holder form an insert of the respective connector part.

18. The connector assembly according to claim 15, wherein the first and/or the second type of first and/or second contact elements are standardized plug-in connectors and are accommodated in receptacles of the first and/or second connector part, respectively, which receptacles form sockets for the standardized plug-in connectors.

19. A connector assembly,
comprising a first connector part and a second connector part,
the first connector part comprising a lever which is pivotably mounted on a base body of the first connector part for pivotable movement about a pivot axis between a first and a second position relative to the base body of the first connector part,
the connector assembly can be brought from a ready-to-mate state into a mated state by relative movement of the first and the second connector part towards each other along a connection axis and vice versa,
the first connector part accommodates a plurality of a first type of first contact elements of the first connector part and the second connector part accommodates a plurality of a first type of second contact elements of the second connector part wherein the first type of first contact elements matches the first type of second contact elements,
the plurality of the first type of first contact elements and the plurality of the first type of second contact elements being respectively connected in the mated state of the connector assembly,
wherein the lever is in the first position when the connector assembly is in the mated state, wherein at least one engaging portion of the lever is engaged with at least one counter-engaging portion of the second connector part,
wherein the at least one engaging portion of the lever interacts with the at least one counter-engaging portion of the second connector part of the connector assembly in such a way, that the connector assembly is forcibly brought from the mated state into the ready-to-mate state by pivoting the lever from the first position into the second position when the connector assembly is in the mated state, and
wherein the at least one counter-engaging portion of the second connector part is formed as an elongate protrusion on the second connector part, particularly extending in a direction perpendicular to a connection direction and preferably perpendicular to the pivot axis of the lever.

* * * * *